May 4, 1954

M. TELKES 2,677,243

METHOD AND APPARATUS FOR THE STORAGE OF HEAT

Filed Aug. 28, 1952

INVENTOR.
MARIA TELKES
BY
Kenyon & Kenyon
ATTORNEYS

May 4, 1954     M. TELKES     2,677,243
METHOD AND APPARATUS FOR THE STORAGE OF HEAT
Filed Aug. 28, 1952     2 Sheets-Sheet 2
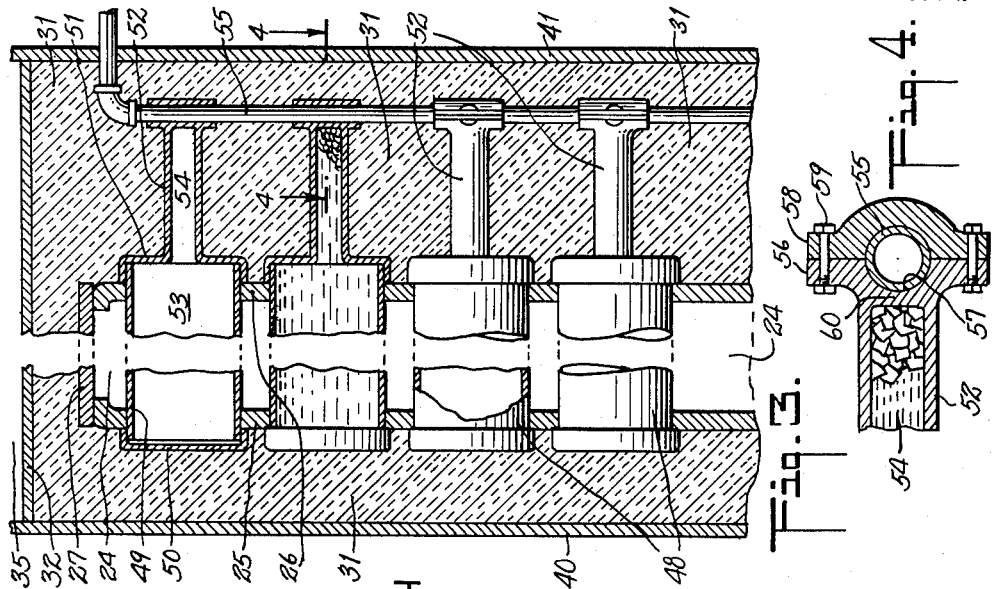
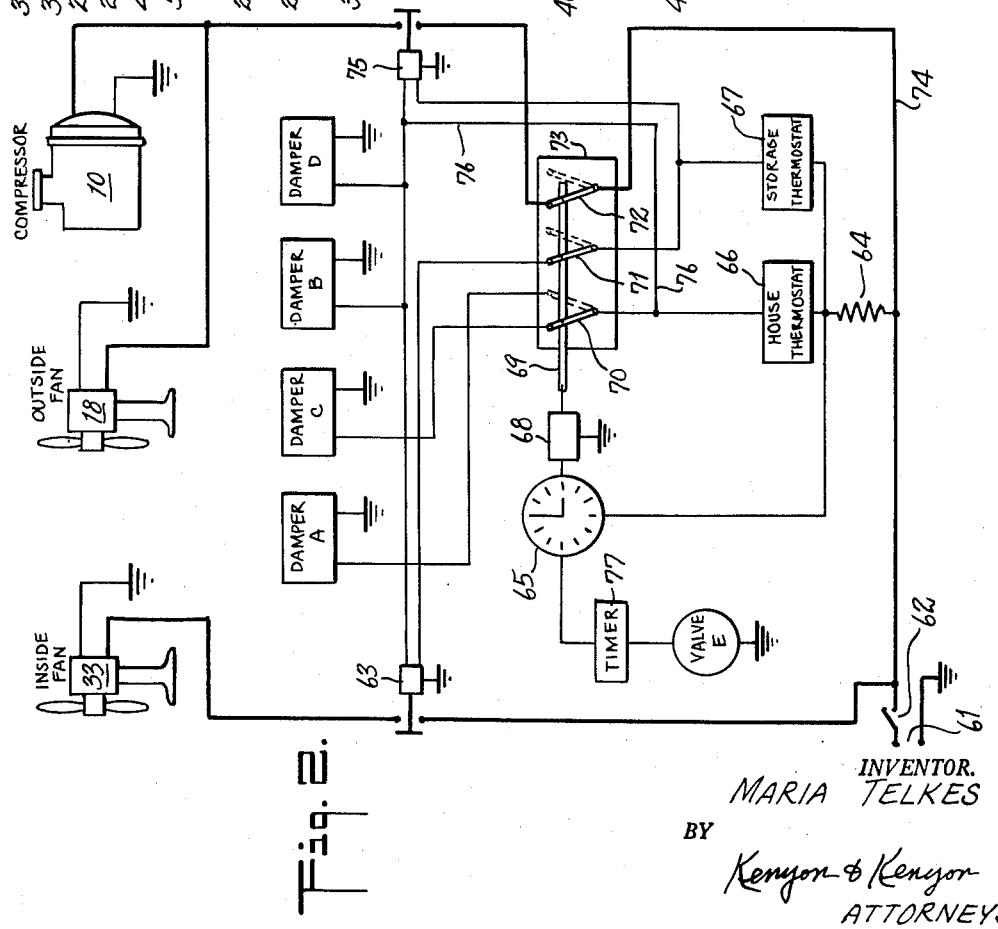
INVENTOR.
MARIA TELKES
BY
Kenyon & Kenyon
ATTORNEYS Patented May 4, 1954

2,677,243

UNITED STATES PATENT OFFICE 2,677,243

METHOD AND APPARATUS FOR THE STORAGE OF HEAT

Maria Telkes, Cambridge, Mass.

Application August 28, 1952, Serial No. 306,797

10 Claims. (Cl. 62—4)

This invention relates to an apparatus for storing heat, utilizing the priniciple of the heat of fusion, and a process for releasing heat thus stored.

Recent efforts to utilize a conventional heat-pump for residential heating, with outdoor air as the low temperature source of heat, have shown that it is desirable and probably economically necessary to employ heat storage facilities if electric current is to compete with household fuels. Furthermore, heat storage permits utilization of low cost off-peak current in communities where such current is available.

Efforts to use heat storage apparatus, usually employing disodium orthophosphate dodecahydrate as the heat storage composition, have indicated the existence of a serious problem of crystal seeding. Since the heat storage composition is necessarily charged within a sealed container to prevent contamination and loss, mechanical introduction of seeding crystals is not feasible. The absence of proper seeding permits "under-cooling," that is, failure to crystallize despite temperature drop below the melting point of the particular heat storage composition used. It also may, in some cases, cause degradation of crystal forms on subsequent freezing cycles, with ultimate inability of the mass to crystallize in the desired manner and the release of excess water which dilutes the mass. An example of the latter is the tendency of disodium orthophosphate dodecahydrate, after several cycles of freezing and melting, to recrystallize in the form of disodium orthophosphate heptahydrate, with altered and unsatisfactory heat release characteristics, effectively destroying the efficiency of heat storage.

According to the present invention, a limited portion of the heat storage composition is either maintained continuously at, or is occasionally subjected to, a temperature substantially lower than the melting point of the composition, and specifically below the temperature of metastable supersaturation of the composition. By this means seeding nuclei are maintained or formed in a limited portion of the mass of heat storage material, and when the same has been under-cooled below its melting point in an effort to extract heat therefrom, crystal formation based upon such nuclei spreads rapidly throughout the mass releasing large quantities of latent heat.

Herein I show one form of an apparatus for carrying out the invention. For purposes of illustration, I show a device adapted to store heat delivered to it by a heat-pump from a low temperature source such as outside air, and to release such heat to the air of a house.

Referring to the attached drawings which form part of this specification,

Fig. 2 is a diagram of electrical circuits which may be employed in the operation of the apparatus shown in Fig. 1;

Fig. 3 is a vertical cross-section taken on the plane 3—3 of Fig. 1, with parts cut away;

Fig. 4 is a partial horizontal section taken on the plane 4—4 of Fig. 3.

Heat-pump system

Figure 1:
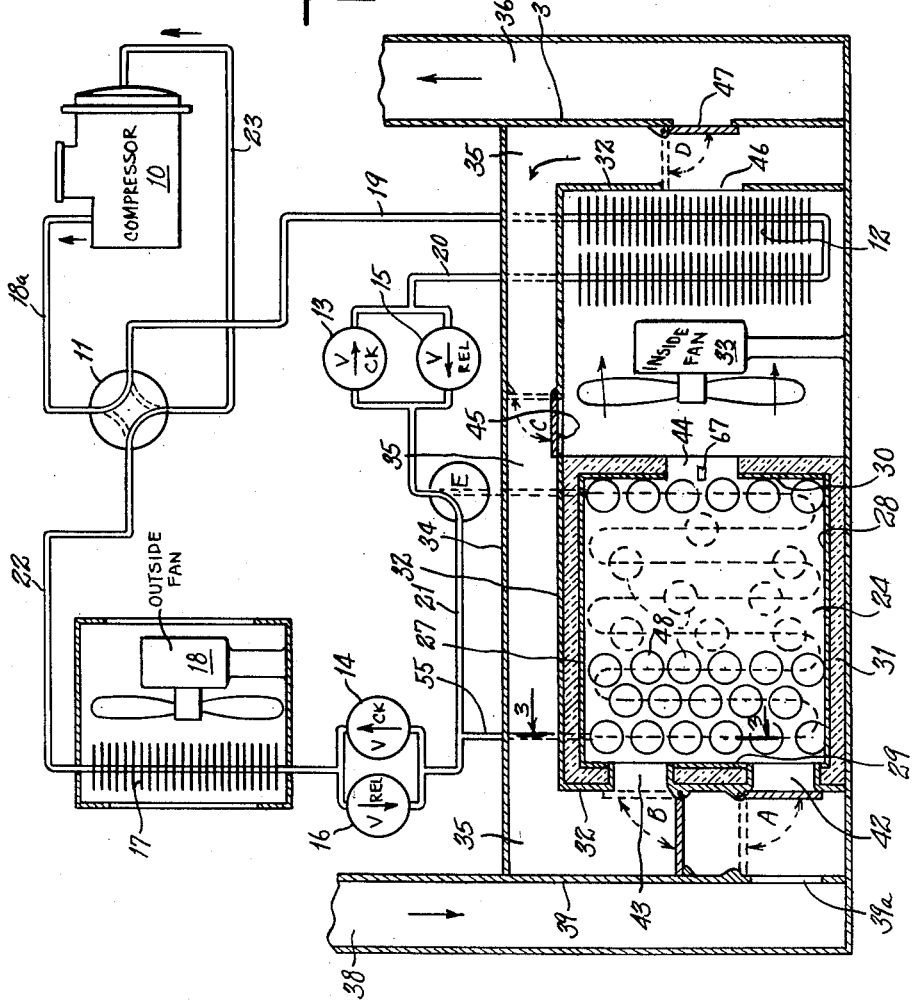
Fig. 1 is a diagrammatic vertical cross-section of a heat storage apparatus built according to the present invention.

The heat-pump system disclosed in Fig. 1 is adapted at will to pump heat from a low temperature source such as cold outdoor air into living space, for example, a house to be heated during the winter; or by turning valve 11 to another position to pump heat from the house into the outdoors during the summer. Except as respects my apparatus for storing heat and the parts and devices appurtenant thereto, the heat-pump system here described is generally that which has been the subject of extended recent tests and is disclosed in the published literature, for example, Ambrose, "Heat Pump Installations for Residential Use," Mechanical Engineering, February 1951, pp. 115–120. The article cited describes a system in which heat storage is employed, consisting of an auxiliary water-circulating system having a storage tank, a water-conditioner coil and a water-circulating pump. The present invention, among other things, obviates the need for including these last-named items, although the apparatus here disclosed is useful as well in the storage of heat having its source elsewhere than in the delivery of a heat-pump unit.

Referring to Fig. 1, the heat-pump system includes a compresor 10, 4-way valve 11, conditioner coil 12, check valves 13 and 14, pressure release valves 15 and 16, and outside coil 17. 4-way valve 11, which may be manually or thermostatically controlled, directs the high temperature refrigerant fluid delivered through pipe 18a by compressor 10 into pipe 19 and conditioner coil 12 if the house is to be heated, or into pipe 22 and outside coil 17 if the house is to be cooled. 4-way valve 11, which is shown diagrammatically in Fig. 1, may be of any well-known construction.

If the house is to be heated, 4-way valve 11 is placed in the position shown in solid lines in Fig. 1 and refrigerant fluid issuing at high temperature and pressure from the compressor 10 passes to conditioner coil 12 where it gives up heat to inside air. Fluid emerging from conditioner coil 12 through pipe 20 is caused by check valve 13 to pass through pressure release valve 15 where its pressure, and hence its temperature, falls. The fluid, thus reduced in temperature and pressure, then passes through by-pass valve E, whose function will be subsequently explained, and pipe 21 to check valve 14 which admits it to outside coil 17. Here the refrigerant fluid is warmed by heat exchange with outdoor air and returns through pipe 22, 4-way valve 11 and pipe 23 to the compressor 10 where the cycle is repeated.

If the house is to be cooled, 4-way valve 11 is placed in the position shown in dotted lines in Fig. 1 and refrigerant fluid issuing at high temperature and pressure from compressor 10 passes to outside coil 17 where it gives up heat to outside air. It then passes through pressure release valve 16 where its pressure is reduced and its temperature is further reduced, and it then passes through pipe 21, check valve 13 and pipe 20 to conditioner coil 12 where it absorbs heat from inside air. Thereafter it passes through pipe 19, 4-way valve 11 and pipe 23 to the compressor 10 where the cycle is repeated.

In such a system the fluid may have a temperature on the order of 100° F. as it passes through pipe 19 to conditioner coil 12, or through pipe 22 to outside coil 17. And it has a much lower temperature, in certain typical installations approximately 25° F., as it passes through pipe 21 after discharge to that pipe from release valve 15 or 16.

When the heat-pump is arranged to heat the interior of a house, for example, in the winter, experience indicates that the efficiency of the system begins to be impaired when the outside temperature falls below about 35° F. In the article above cited the system described therein uses a 3-H. P. heat-pump for ordinary conditions and a supplemental 2-H. P. heat-pump as a supplement to be operated when the outdoor temperature is 26° F. and below. For summer cooling, only the 3-H. P. system is used. It is stated that studies have indicated that with efficient heat storage, a 3-H. P. unit should be sufficient at all times of the year under the climatic conditions prevailing in the northern part of the United States.

*Air chamber and ports*

According to the present invention (see Figs. 1 and 3) I provide an air chamber 24 formed between two parallel side plates 25 and 26 secured together by a top plate 27, a bottom plate 28 and end plates 29 and 30. The chamber thus formed is preferably lagged with heat insulating material 31.

Air chamber 24 is positioned within a casing 32 which contains, in addition to air chamber 24, an inside fan 33 and conditioner coil 12. Horizontal sheet 34 parallel to and spaced from casing 32 forms therewith an air duct 35. Delivery duct 36 is formed of suitable sheet material including panel 37 which separates duct 35 from duct 36. Inlet duct 38 is formed of suitable sheet material including panel 39 which separates duct 38 from duct 35. Suitable side plates 40 and 41 (Fig. 3) complete the enclosure.

A series of ports (see Fig. 1) determine the path of air flow under propulsion of the inside fan 33. Port 39a located in plate 39 permits air to pass from inlet duct 38 to duct 35. Port 42, controlled by damper A, and port 43, controlled by damper B, are positioned in one end of casing 32 and afford direct access from duct 35 into air chamber 24. Port 44, located in the opposite end plate of air chamber 24, permits air to pass from air chamber 24 direct to the suction side of inside fan 33. Port 45 in casing 32 at the top of the latter and, in effect, positioned between air chamber 24 and fan 33, affords an air passageway from duct 35 direct to the suction side of fan 33. Port 45 is controlled by damper C. Port 46 at the opposite end of casing 32 permits air propelled by fan 33 through conditioner coil 12 to pass into duct 35. Port 47, controlled by damper D, permits air to pass from duct 35 into delivery duct 36.

Dampers A, B, C and D may be mounted in any suitable manner for the control of their respective ports. In Fig. 1 I have indicated diagrammatically one form of mounting, each damper being hinge-mounted, but any other known form of mounting or construction may be used. It will be understood that each of these dampers is spring-loaded to bias it towards the position shown in solid lines in Fig. 1, and may be solenoid-actuated, when the appropriate circuit is energized, to move the damper to the position shown in dotted lines in Fig. 1 and to remain in that position so long as the circuit continues to be energized. The mechanical details of hinge-mounting, spring-loading and solenoid-actuation are not shown, since they are well known in the art and by themselves form no part of the present invention. The actuating circuits are, however, shown in Fig. 2, to be explained below.

*Containers for heat storage composition*

Within air chamber 24 are mounted a series of cylindrical tubular members indicated generally by the reference character 48 and herein called the "containers." In the preferred form of my apparatus, which is assumed to be a heat storage unit holding about one ton of heat storage composition, each tube is preferably about 4" in diameter, about 4½' long, and is adapted to hold about 18 lbs. of a composition such as disodium orthophosphate dodecahydrate. One hundred ten such tubes will hold a ton of this composition. For convenience, each tube preferably consists of a cylindrical shell 49 (see Fig. 3) of any suitable heat-conducting material, such as steel plated for corrosion resistance or a non-corrosive metal, having tightly affixed to one end thereof a flat end cap 50, and to the opposite end thereof an end cap 51 to which there has been attached or from which there has been drawn or formed a neck 52 preferably of the same material. If tube 49 is 4" diameter, neck 52 may be ⅛" inside diameter, and approximately 1 or more inches in length. The arrangement of shell 49, end caps 50 and 51 and neck 52, is such as to create, for each tubular member 48, an internal cavity 53 within the end limits of shell 49, and a smaller cavity 54 within the end limits of neck 52, which said two cavities are in open fluid communication with each other.

Neck 52 is arranged, at its end remote from shell 49, to be physically interconnected through a heat-conducting path, preferably metallic, with a pipe or conduit 55. According to one feasible arrangement (see Fig. 4), neck 52 is made with a flanged end portion 56 having therein a recess 57 within which pipe 55 is adapted to lie. A cap 58 secured to flanged end 56 in some suitable way, as, for example, by nuts and bolts 59, secures pipe 55 in firm contact with recess 57. Recess 57 is formed in the end of neck 52 in such manner as to provide a wall 60 which serves as a portion of the enclosure for the entire container 48 and also as a part of the conducting path whereby heat may be intercharged between material within container 48, occupying cavities 53 and 54, and fluid flowing through pipe 55.

The mounting of containers 48 is preferably as follows: The tubular shells are secured, near each end thereof, in side plates 25 and 26 with substantially all of the exterior surface of cylindrical shell 49 exposed to contact with air passing through air chamber 24, which is defined in part by plates 25 and 26. Thus, the cylindrical wall portions of containers 48 (excluding, however, the neck 52) serve as a conducting pathway for the interchange of heat between material in containers 48 and especially in the larger cavity 53 thereof, and air passing through chamber 24. No such pathway for heat conduction is afforded by the necks 52. These, in the preferred arrangement, are not arranged to be in contact with air passing through chamber 24, although in some cases it may be advantageous to do so. Material in cavity 54 within neck 52 is, in accordance with this invention, in heat interchange relationship with fluid passing in pipe or conduit 55, for a purpose to be stated.

*Heat storage compositions*

The heat storage composition is placed in each of containers 48, and permanently sealed therein. A number of such chemicals are known, each operating on the "heat-of-fusion" principle. Heat storage occurs at the particular temperature level established by the melting point of the particular composition used. Examples of such materials, showing the temperature at which storage occurs (i. e. the melting point) and the storage capacity at that temperature in B. t. u.'s per lb., are shown in the following table. Other such chemicals are known to those skilled in the art.

| Material | Melting Point | Heat Stored at M. P., B.t.u./lb. |
|---|---|---|
| $CaCl_2.6H_2O$ | 84 | 78 |
| $Na_2SO_4.10H_2O$ | 90 | 111 |
| $Na_2HPO_4.12H_2O$ | 96 | 131 |
| $Ca(NO_3)_2.4H_2O$ | 108 | 74 |
| $Na_2S_2O_3.5H_2O$ | 120 | 108 |
| $NaCH_3COO.3H_2O$ | 137 | 109 |

It is a common characteristic of the above listed, and of other known analogous and equivalent heat storage compositions, that when they are in the liquid state and cool air is passed in heat interchange relation therewith for the purpose of extracting heat by crystallizing the composition, crystallization will begin when the temperature falls to the melting point only if suitable seeding nuclei are present to serve as a focal point for crystal growth. If such nuclei are present, crystal formation will proceed and, in the course thereof, the mass will remain at its melting point without fall in temperature until crystallization is complete. And during this time the mass gives up its stored energy as latent heat, which can be transferred by suitable heat interchange to a passing current of air or other fluid. Recharging is accomplished merely by passing hot air (i. e. air whose temperature is above the melting point of the composition) in heat interchange relation therewith, which causes the crystals to melt without rise of temperature till melting is complete.

The difficulty which has heretofore been encountered in extracting heat from such a system is that of providing the necessary seeding nuclei, especially where the heat storage composition is permanently sealed within a closed container. If no seeding nuclei are present, the melted composition falls in temperature without crystalizing, a phenomenon called "under-cooling," which has the practical and undesired effect that the stored heat cannot be extracted at the temperatures desired for house-heating, or the like. Various means to bring seeding nuclei, or simulations thereof, into contact with the melted composition have been proposed, but these have the defects either that they will not work if all crystals are lost, or require liquid-tight rotary joints for moving parts, or will not seed any composition other than the one simulated.

According to the present invention, seeding nuclei are created or maintained by chilling a minor part of the heat storage composition to a temperature below its temperature of metastable supersaturation. Each of the compositions listed above possesses the property that, if cooled below its melting point under conditions where no seeding nucleus is present, it will "under-cool" without crystallization; but, if further cooled to what is called the temperature of metastable supersaturation, it will then crystallize even though no seeding nucleus is present. The temperature of metastable supersaturation is generally from 30 to 40° F. below the melting point of materials which melt in the range from 90° to 130° F. In the case, for example, of disodium orthophosphate dodecahydrate, the melting point is about 96° F. and the temperature of metastable supersaturation is about 66° F.; in the case of sodium sulfate decahydrate, the corresponding temperatures are about 90° F. and 59° F. Crystals created by chilling the undercooled liquid below its temperature of metastable supersaturation, in a minor part or extension of the main container, thus become seeding nuclei which promote rapid crystallization through the whole body of the composition. Thus heat may be released at the desired temperature.

The apparatus of the present invention takes advantage of the above described phenomenon and is for convenience described in its application to the space heating of human habitations, though the apparatus is believed to have other uses and applications as well. In the specific form here described, the apparatus is applied to the storage of heat received from and intended to be released at a temperature suitable for transfer to inside air circulating from and to a human habitation. In this application it is convenient to select a composition whose melting point is approximately 90° to 96° F. Other applications may call for storage of heat at higher or lower levels depending upon the temperature of the source of heat and its intended use. It is to be understood that the selection of an appropriate heat storage composition depends upon the nature of the particular use or application.

I prefer, for the storage of heat delivered by a heat-pump and to be used in the heating of living space, to employ disodium orthophosphate dodecahydrate. This composition has a melting point of about 96° F. It may be charged to the containers 48 in liquid form (i. e. at a temperature above its melting point) and each of the containers 48 is thus filled and sealed. I have found it advantageous and desirable in some cases, after filling and sealing the containers in the manner above described, to subject them for a period of about an hour to an elevated temperature approximately the temperature of boiling water.

Chilling the necks

As thus prepared the containers are mounted in position as shown in Fig. 3, with the main bodies thereof in the air chamber 24 and the necks protruding laterally of the chamber. The necks 52 are then suitably attached to pipe or conduit 55, using soldering if desired to improve the certainty of heat transfer, and pipe 55 is then interconnected through bypass valve E with pipe 21 of the refrigerant circuit of the heat-pump unit, this being the portion of said circuit where the refrigerant moves at lowest temperature, usually well below 66° F.

Bypass valve E, shown diagrammatically in Fig. 1, in each of its two positions either directs low temperature refrigerant fluid into pipe 55 and thus causes it to chill the necks 52, or else into pipe 21 where it flows without exerting any cooling effect upon the necks. Valve E may be manually operated, but I prefer that its actuation shall be in response to a clock-controlled switch in such manner that refrigerant fluid at a temperature around, say, 30° F. is directed intermittently through pipe 55 at predetermined intervals or at predetermined times, sufficient to assure either that the temperature in necks 52 never rises to the point where all seeding nuclei in said necks are lost, or else to restore seeding nuclei in said necks by cooling below the temperature of metastable supersaturation at regular intervals or at predetermined times of the day. Since such clock-controlled switches, including switches for valve actuation, are well known I do not describe the same here in detail.

In many cases it may be desirable to have the necks 52 of containers 48, as well as pipe 55, buried in heat insulating material 31 (see Fig. 3). In such cases the residual crystals which remain in necks 52 after the heat storage chemical in the main part of containers 48 has been entirely melted will ordinarily remain for many hours. I believe that, if necks 52 are well insulated, it will ordinarily be necessary to subject them to low temperature for only a very short time in each twenty-four hours, for instance, ten to thirty minutes once in each twenty-four hour period. Accordingly, I have shown diagrammatically in Fig. 2 a timer device 77 arranged to actuate valve E to the position shown in dotted lines in Fig. 1, at such intervals as are desirable and preferably once a day. During this period refrigerant fluid at low temperature is diverted temporarily through pipe 55, and thus the heat storage material in the necks 52 is subjected to a brief but vigorous chilling which assures the formation of crystals in any of the necks where such crystals may have entirely melted away, or preferably the maintenance in each neck of a nucleus of crystals to serve for seeding purposes when required. If the peak load period is from 3:00 to 10:00 p. m., it may be assumed ordinarily that the heat-pump unit will begin to run at 10:00 p. m. in order to replenish heat drained from storage during the previous seven hours. The arrangement, therefore, may be such that valve E is in the position shown in dotted lines in Fig. 1 from 10:00 to 10:30 p. m., thereupon resuming its normal position.

It will be understood by those skilled in the art that any other desired arrangement may be employed for maintaining the material in necks 52 at or below the temperature of metastable supersaturation for the particular composition used. While I have herein shown the use of refrigerant fluid for this purpose, included within the scope of this invention is the use of other fluids for like purpose flowing in pipe 55 or its equivalent. For example, cold water, if its temperature is below about 66° F., will be satisfactory if the chemical used is disodium orthophosphate dodecahydrate. In winter weather, low-temperature outside air passed through pipe 55 or equivalent conduit in heat interchange relation with necks 52, will accomplish the same effect. Thus I may use any one of a number of fluids, whether the same be liquid or gaseous in form, to chill the necks 52 to the required temperature and below. The flow of such fluid may be timer-clock controlled, as hereinabove shown, or it may be thermostatically controlled or continuously flowing if desired. Exposure of necks 52 to outdoor air in the wintertime in a climate corresponding to that of Boston, Massachusetts, will ordinarily keep these necks at a temperature well below the required temperature in the case of the preferred chemical mentioned above.

Control circuits when heat storage is used with off-peak heat-pump operation In Fig. 2 I show the electrical circuits which may be employed in connection with a heat-pump for heating and cooling a house, using the apparatus of my invention for storage of heat during the house heating cycle, in the particular application in which my heat storage apparatus is used for the purpose, among other things, of providing heat during peak-load hours when the heat-pump itself is not operating. In many localities the rates for "off-peak" current are less than for current delivered during peak-load hours (the latter usually 3:00 to 10:00 p. m.), and in some cases off-peak current costs as little as one-third the cost of peak-load current. One application of my apparatus for heat storage is to permit off-peak current to be used for heat-pump operation, and to confine the use of the more costly peak-load current to withdrawal of heat from storage as required. The electrical system diagrammed in Fig. 2 is adapted to achieve this end, using the apparatus and heat-pump system disclosed in Figs. 1, 3 and 4.

Referring to Fig. 2, the source of current 61 is controlled by main heating switch 62. Current passes to inside fan 33 on the closing of a thermostatically controlled switch 63. Current also passes to compressor 10 and outside fan 18 on the closing of thermostatically controlled switch 75. Current also passes through voltage reducing resistance 64 to a controller clock 65, a suitably located house thermostat 66 and a storage thermostat 67 located near the air-exit from air chamber 24 (see Fig. 1). Clock 65, suitably arranged in accordance with the peak and off-peak requirements of the supplying utility, controls solenoid switch 68 which in turn actuates bar 69 connected to switch arms 70, 71 and 72, movable in gang. These may be mounted upon a panel 73. The arrangement is such that switch arms 70, 71 and 72 are in the position shown in solid lines in Fig. 2 during off-peak hours, and are in the position shown in dotted lines during peak-load hours.

Clock 65 also controls a timer 77 which causes valve E to be turned to bypass position for a predetermined length of time at a predetermined hour in the day.

The operation of storage thermostat 67 may be as follows: When the temperature of the air leaving air chamber 24 falls below a predetermined temperature, indicating approaching exhaustion of storage, current at reduced voltage will flow through thermostat 67. Flow of current through storage thermostat 67 energizes and closes switch 75, thereby causing current to flow to the motors of compressor 10 and of outside fan 18 if switch 72 is closed (as it is during off-peak hours). Current from storage thermostat 67 also flows to switch arm 71. If this arm is in the position which it assumes during off-peak hours (solid lines in Fig. 2) the effect is to energize and thereby close switch 63 thereby powering the inside fan 33.

The effect is thus, during off-peak hours, to cause the heat-pump system and the inside fan to operate. Since all dampers remain in the positions shown in solid lines in Fig. 1, the result is that heat is pumped to storage as follows, viz: Assuming that 4-way valve 11 is in the position shown in Fig. 1, conditioner coil 12 becomes hot and inside fan 33 propels air through coil 12, thence through port 46, air duct 35 and port 43 into air chamber 24, finally returning through port 44 to fan 33. Thus, the air within the apparatus is moved in a closed circuit thereby transferring heat from coil 12 to the heat storage composition contained within containers 48. Preferably the pumping of heat to storage continues until such time as the heat storage composition within all of containers 48 has been melted and the temperature of the air emerging from air chamber 24 begins to rise above the melting point of such composition. The thermostat is arranged to open its circuit at this time, thereby terminating the recharging of heat storage. During peak-load hours, however, the position of switch arms 71 and 72 (in dotted line position as seen in Fig. 2) prevents current from storage thermostat 67 causing power to flow either to compressor 10, outside fan 18 or inside fan 33.

When house thermostat 66 calls for heat to be supplied to the living space, as for example when the temperature in its vicinity falls below 70° F., current flows at low voltage through house thermostat 66 and thence through line 76 to each of switches 63 and 75. Since the closing of switch 75 will cause current to flow to the motors of compressor 10 and outside fan 18 only in the event that switch 72 is closed (which it is only during off-peak hours), the result is that the compressor and outside fan are actuated by the house's call for heat only during off-peak hours. However, the house's call for heat causes inside fan 33 to be powered at any time of the day.

The flow of current in line 76 also powers the solenoids which actuate dampers B and D, this occurring at any hour of the day. If the house's call for heat comes during off-peak hours, current from house thermostat 66 will flow through switch arm 70 (solid lines in Fig. 2) to actuate damper C; but damper A will remain unactuated. If the house's call for heat comes during peak-load hours, current from house thermostat 66 will flow through switch arm 70 (dotted lines in Fig. 2) to actuate damper A; but damper C will remain unactuated. The arrangement is such, therefore, that a call for heat from the house during off-peak hours results in the actuation of the heat-pump unit including outside fan, inside fan, and dampers C, B and D. On the other hand, if the call for heat comes during peak-load hours, the effect is to power inside fan 33, and to actuate dampers A, B and D.

As will be seen from Fig. 1, the actuation of dampers B, C and D (an off-peak hour call) results in moving each of said dampers to the position shown in dotted lines in Fig. 1, damper A remaining as it is. With inside fan 33 in operation, the effect is that air is drawn downwardly from the house through inlet duct 38, passing thence through port 39a into duct 35, thence between casing 32 and sheet 34, through port 45, through the blades of fan 33, coil 12, ports 46 and 47 to delivery duct 36 for return to the house. Under these conditions a call for heat during off-peak hours will be supplied direct from the heat-pump unit itself, and not from storage.

If the house's call for heat occurs during peak load hours, the electrical arrangements above described cause dampers A, B and D to move to dotted-line position (Fig. 1), and the energization of fan 33, damper C remaining as it is and the heat-pump unit not being energized. The result is that air drawn from the house through inlet duct 38, passes through ports 39a and 42 into air chamber 24 where it picks up heat by interchange with the contents of containers 48, and passes thence through port 44, the blades of fan 33 and coil 12 (not heated at this time), ports 46 and 47 to delivery duct 36 for return to the house. Under these conditions, a call for heat during peak-load hours will be supplied from the storage unit.

The apparatus shown in Fig. 1 can also be used for cooling a house in hot weather. In this case 4-way valve 11 is turned to the position shown in dotted lines in Fig. 1, outside coil 17 becomes a dissipator of heat to the atmosphere, conditioner coil 12 becomes a cooling coil and the heat storage chemical in containers 48 is not used for heat storage purposes. Under these conditions response of the several dampers to house thermostat 66 is immaterial, and their response to storage thermostat 67 can be obviated by a suitable switch (not shown) as will be understood by those skilled in the art.

Apparatus constructed in accordance with my invention may also be used for the storage of heat at low temperature, for example, on the low temperature side of a heat-pump system utilizing outdoor air for a heat source. In this case the composition used for heat storage is desirably one having a melting point at or a little above 50° F. Such a composition may, for example, consist by weight of approximately 19% to 25% sodium sulfate and 17% to 21% magnesium sulfate, each taken on an anhydrous basis, with up to approximately 5% of a sulfate of iron zinc, potassium, copper, manganese or ammonium, and the rest water. The mixture of sodium and magnesium sulfate has a melting point around 68° to 70°, and the addition of the other sulfate depresses this melting point to 60° F. and in some cases approaching 50° F. A composition of this kind is suitable for the storage of heat on the low temperature side of a heat-pump unit operating in a winter climate corresponding to that of New England, storing heat on occasional "warm winter days" for use during cold snaps. When my apparatus is used in such an application it may be necessary to chill the necks of the containers to a temperature on the order of 20° F. Except for differences in the storage composition used and the temperature applied to the necks, use of the apparatus in such case is similar to that shown herein.

The process according to my invention is not limited to any particular form of apparatus, though it may be carried out in an apparatus such as that shown herein.

The apparatus according to my invention may take various shapes and forms. I do not desire to be limited to an apparatus of any particular shape or form, or put to any particular use, but to have the advantage of my invention as and to the extent set forth in the following claims.

What is claimed is:

1. Apparatus for storing the heat delivered by a heat-pump comprising an air chamber through which air to be heated is adapted to be passed, a closed container adapted to be charged with a composition which upon crystallization releases latent heat and having an extended portion of its exterior surface in heat transfer relation with air passing through said chamber, and a pipe through which refrigerant fluid of the heat-pump is adapted to be passed while in a low temperature phase of its cycle, said container having a different portion of its exterior surface in heat transfer relation with refrigerant passing through said pipe, whereby part of the composition in said container may be chilled to promote crystal-formation regardless of the temperature of the air.

2. Apparatus for storing heat comprising an air chamber through which air is adapted to be passed, a closed container adapted to be charged with a composition which upon crystallization releases latent heat and having an extended portion of its exterior surface in heat transfer relation with air passing through said chamber, and a pipe through which water is adapted to be passed at an inlet temperature lower than the temperature of metastable supersaturation of the composition in the container, said container having another portion of its surface in heat interchange relation with the water passing through said pipe, whereby part of the composition in said container may be chilled to promote crystal-formation regardless of the temperature of the air.

3. Apparatus for storing heat comprising an air chamber through which a first current of air is adapted to be passed, a closed container adapted to be charged with a composition which upon crystallization releases latent heat and having an extended portion of its exterior surface in heat interchange relation with said current of air passing through said chamber, and a conduit through which a second current of air is adapted to be passed at a temperature lower than the temperature of metastable supersaturation of the composition in the container, said container having another portion of its surface in heat transfer relation with the air passing through said conduit, whereby part of the composition in said container may be chilled to promote crystal-formation regardless of the temperature of the air passing in said first conduit.

4. Apparatus for storing heat comprising an air chamber through which air is adapted to be passed, a closed-end tube mounted in said chamber with its exterior cylindrical surfaces in heat exchange relation with air passing through said chamber, a closed-end tube of smaller diameter than the first-named tube secured thereto, the interior cavity of the smaller tube being in fluid communication with the interior cavity of the first-named tube and the said cavities being adapted to be charged with a composition which upon crystallization releases latent heat, and a fluid conduit, the tube of smaller diameter and said fluid conduit being arranged to permit heat interchange between the contents of said tube and fluid passing in said conduit, whereby crystals formed or maintained in said smaller tube under the influence of fluid passing in said conduit serve as seeding nuclei to promote crystallization in the first-mentioned tube.

5. Apparatus for storing the heat delivered by a heat-pump from a low temperature source comprising an air chamber through which air to be heated is adapted to be passed, a closed-end tube mounted in said chamber with its exterior cylindrical surfaces exposed to air passing through the chamber, a closed-end tube of smaller diameter secured to the first-named tube with the interior cavities of the two tubes in fluid communication and adapted to be charged with a composition which upon crystallization releases latent heat, a conduit through which refrigerant fluid of the heat-pump is adapted to be passed while in the low temperature phase of its cycle, and a heat-conducting wall separating the contents of the smaller tube and the contents of said conduit, whereby crystals formed or maintained in said smaller tube by the chilling effect of refrigerant fluid passing in said conduit serve as seeding nuclei to promote crystal-formation in the first-mentioned tube when the air passing over said first-mentioned tube is at a temperature below the melting point of the composition contained therein.

6. Apparatus for storing heat comprising an air chamber and a fluid conduit, a closed container made of heat-conducting material and adapted to be filled with a composition possessing a substantial heat of fusion and a melting point in the temperature range from about 50° F. to about 150° F., one portion of the surface of said container being adapted to serve as a heat-conducting pathway for heat-exchange between the contents of the container and air passing in said chamber, and another portion thereof for heat-exchange between the contents of the container and fluid passing in said conduit, means to propel through said chamber a current of air warmer than the melting point of said composition when it is desired to store heat, and colder than said melting point when it is desired to extract heat, and means to propel through said conduit a fluid whose temperature is below the temperature of metastable supersaturation of the composition in said container.

7. Apparatus as described in claim 6 wherein the composition is selected from the group comprising sodium sulfate decahydrate and disodium orthophosphate dodecahydrate, and the fluid propelled through said conduit is at a temperature below about 59° F.

8. Apparatus as described in claim 6 having therein a clock-controlled switch for actuting the last-named means intermittently.

9. Apparatus as described in claim 6 wherein the composition is selected from the group comprising sodium sulfate decahydrate and disodium orthophosphate dodecahydrate, and the said apparatus including a clock-controlled switch for actuating the last-named means of claim 6 intermittently to propel through said conduit a fluid whose temperature is below about 59° F.

10. Method of extracting heat from an enclosed mass of composition possessing a substantial heat of fusion which comprises passing a fluid to be heated in heat-interchange relation with the major portion of the mass of said composition, the temperature of said fluid immediately prior to heat-interchange being above the temperature of metastable supersaturation of the composition, and passing a second fluid in heat-interchange relation with a minor portion of the mass of said composition, the temperature of the second-named fluid immediately prior to heat-interchange being below the temperature of metastable supersaturation of the composition.

References Cited in the file of this patent

UNITED STATES PATENTS

| Number | Name | Date |
|---|---|---|
| 2,063,646 | Whitesel | Dec. 8, 1936 |
| 2,107,088 | Scott | Feb. 1, 1938 |
| 2,550,277 | Lhermitte et al. | Apr. 24, 1951 |
| 2,570,867 | Schaefer | Oct. 9, 1951 |

OTHER REFERENCES

"Meteorological Research," Irving Langmuir and others: pages 6 and 7, article entitled "Schaefer's Experiments on the Artificial Production of Ice Nuclei."